United States Patent
Patterson et al.

(10) Patent No.: US 6,320,882 B1
(45) Date of Patent: Nov. 20, 2001

(54) METHOD AND APPARATUS FOR HANDLING MULTIPLE REAL-TIME SERVICE EVENTS

(75) Inventors: Judson J. Patterson; Craig L. Buckler, both of Apex; Michael T. Longfield, Cary, all of NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 08/939,529

(22) Filed: Sep. 29, 1997

(51) Int. Cl.[7] ............................... H04J 3/12; G06F 9/00
(52) U.S. Cl. ..................... 370/522; 370/412; 709/102
(58) Field of Search ........................ 370/522, 411–418, 370/252–254; 709/101, 102, 103, 106, 107; 713/25, 28, 201, 223, 244, 245, 500–502; 379/119, 229, 133, 221, 228

(56) References Cited

U.S. PATENT DOCUMENTS 5,703,940 * 12/1997 Sattar ................................. 379/201
5,712,908 * 1/1998 Brinkman ........................... 379/119
5,717,745 * 2/1998 Vijay .................................. 370/522
5,771,374 * 6/1998 Burshtein .......................... 713/502
5,781,769 * 7/1998 Weber ................................ 709/102

OTHER PUBLICATIONS

Schildt, Turbo C++, McGraw–Hill, p. 151–152, 1990.*

* cited by examiner

Primary Examiner—Wellington Chin
Assistant Examiner—Steven Nguyen

(57) ABSTRACT

A large number of real-time events are efficiently processed using an integer field incremented based on a periodic timer tick and functioning as a global counter. Other integer fields are created for each received real-time event having a value equal to the value of the global counter plus the period of the event. These other fields are stored at the end of a queue that stores all events having the same period. To determine whether any fields in a particular queue have expired, the system checks only the first field in the queue.

16 Claims, 4 Drawing Sheets

METHOD AND APPARATUS FOR HANDLING MULTIPLE REAL-TIME SERVICE EVENTS

FIELD OF THE INVENTION

The present invention relates generally to a technique for managing Signaling Transfer Points (STPs) in a Common Channel Signaling (CCS) network, and specifically to a method and system of handling processing events with real-time service requirements in such a system.

DESCRIPTION OF THE RELATED ART

Common Channel Signaling (CCS) provides a dedicated supervisory network for segregating voice information, data information, and signaling information (i.e., information used to control the network) in a telecommunications network. CCS was developed to meet the increased demands placed on the public telecommunications network by the growing market for voice, data, and information services.

FIG. 1 illustrates a typical CCS network configuration with three key signaling points: Service Switching Points (SSPs) 12; Service Control Points (SCPs) 14; and Signaling Transfer Points (STPs) 16. SSPs 12 are located at a central office to provide CCS trunk signaling and the capability to query a database to determine call routing. SCPs 14 house databases with call routing information that SSPs 12 and other network elements use to provide advanced services in the telecommunications network. STPs 16 route CCS messages between the signaling points and control access to the CCS network.

Unlike other nodes in a CCS network 10, STPs 16 do not generally act as a source or ultimate destination of CCS application messages. Instead they function as both a static and dynamic routing database that control access to, and direct call signaling between, a variety of CCS nodes and networks.

The routing function of the STPs 16, under certain circumstances, requires processing of many real-time events that must be acted upon within, or at the expiration of, a set time period. For example, typical events received by STP 16 must be acted about 30 seconds after they have been received by the STP. To handle these real-time events, conventional STPs 16 implement, in software, an array of counters each having an initial value corresponding to the time period of its real-time event. The counters are periodically decremented based on a real-time clock signal until they expire, which indicates to the STP that the event requires service.

This method of handling real time events, however, requires every active counter to be decremented and checked each clock period. An STP handling a large number of such counters may spend a significant amount of its processing resources checking the counters, thus reducing the message handling capacity of the STP and leading to an overall degradation in the operation of the CCS network.

There is, therefore, a need to improve the ability of an STP to process a large number of real-time events.

SUMMARY OF THE INVENTION

The methods and apparatus consistent with the present invention efficiently handle a large number of processing events requiring real-time service by a computer system. For example, a queue is created for all real-time events that have identical timing periods. The queues are filled with integer-valued elements equal to the value of a global counter plus the period of the corresponding event. The queues are inherently sorted in ascending order, and a processor can quickly determine whether any of the real-time events have expired simply by periodically comparing the first element in every queue with the value of the global counter.

A method consistent with this invention of managing a plurality of real-time events, each event requiring action to be taken after a predetermined time period, includes the steps of: generating values corresponding to each said event from a value of a global counter and the predetermined time period of the corresponding event; (2) placing the generated values in corresponding fields; (3) storing the fields in a queue at a position in the queue in ascending order according to their values; and (4) sequentially comparing the fields in the queue to the global counter starting at a first field in the queue and ending when the value of the global counter is below the value of the most recently compared field; whereby each field for which the global counter is greater than or equal to the value corresponds to an expired event.

An alternate aspect consistent with the present invention is a computer readable medium containing instructions for executing the above described method.

A computer system and a telecommunications network consistent with the present invention comprise a memory including a global counter and at least one queue; means for generating values corresponding to real-time events received by the computer system from a value of the global counter and a predetermined time period associated with the corresponding event; means for placing the generated values in corresponding fields; means for storing the fields in a queue at a position such that the fields are stored farther back in the queue relative to fields stored previously in the queue; and means for sequentially comparing the fields in the queue to the global counter starting at the beginning field in the queue and ending when the value of the global counter is below the value of the most recently compared field. A processor is configured to execute programs in the memory.

Both the foregoing general description and the following detailed description are exemplary and explanatory only and do not restrict the invention, as claimed.

BRIEF DESCRIPTION OF THE DRAWINGS

The accompanying drawings, which are incorporated in and constitute a part of this specification, illustrate several embodiments of the invention and, together with the description, serve to explain the principles of the invention. In the drawings.

DETAILED DESCRIPTION

Reference will now be made in detail to embodiments consistent with the invention, examples of which are illustrated in the accompanying drawings.

The following disclosure describes a method and apparatus that can efficiently process a large number of real-time events requiring service by an STP. Briefly, as described below, an integer field, functioning as a global counter, is incremented based on a regularly occurring event, such as a hardware clock. Other integer fields are created for each received real-time event and have a value equal to the value of the global counter plus the period of the event. The fields, which function as timers, are stored at the end of a queue that stores all events having the same period. To determine whether any fields in a particular queue have expired, the system checks only the first field in the queue.

Figure 1:
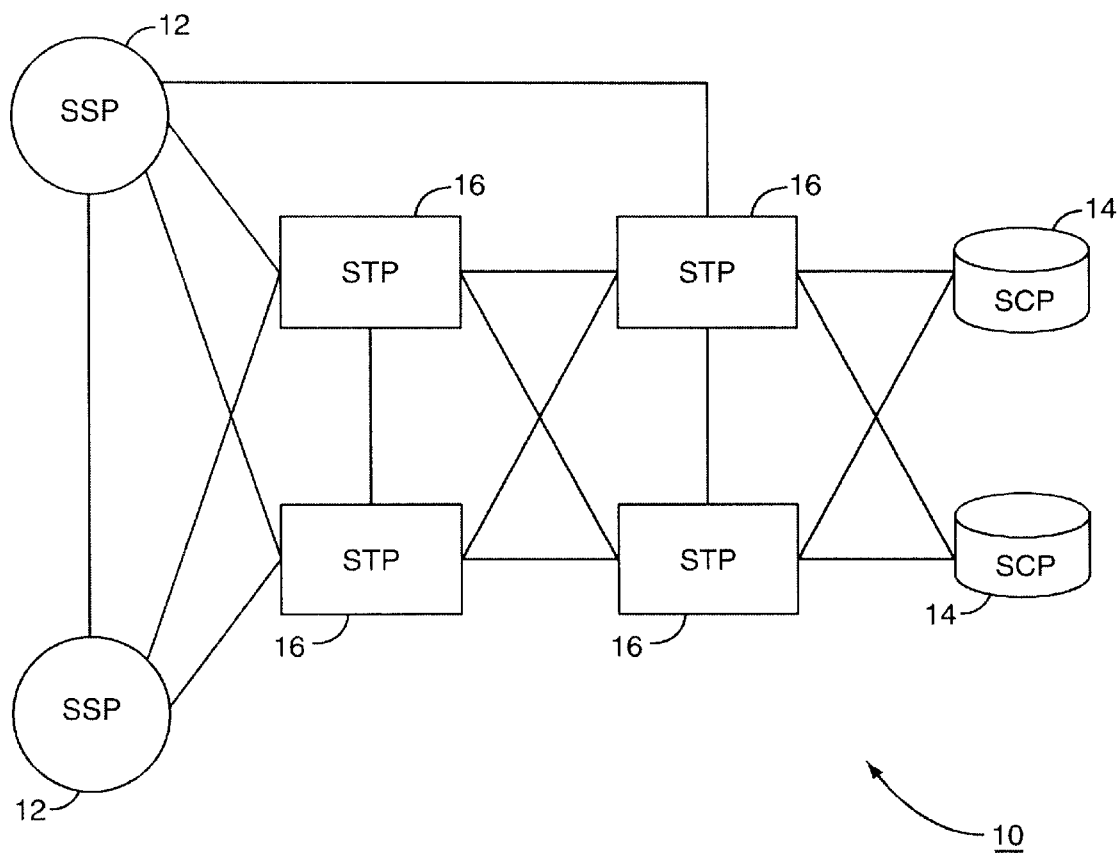
FIG. 1 is an illustration of a common channel signaling network.
Figure 2:
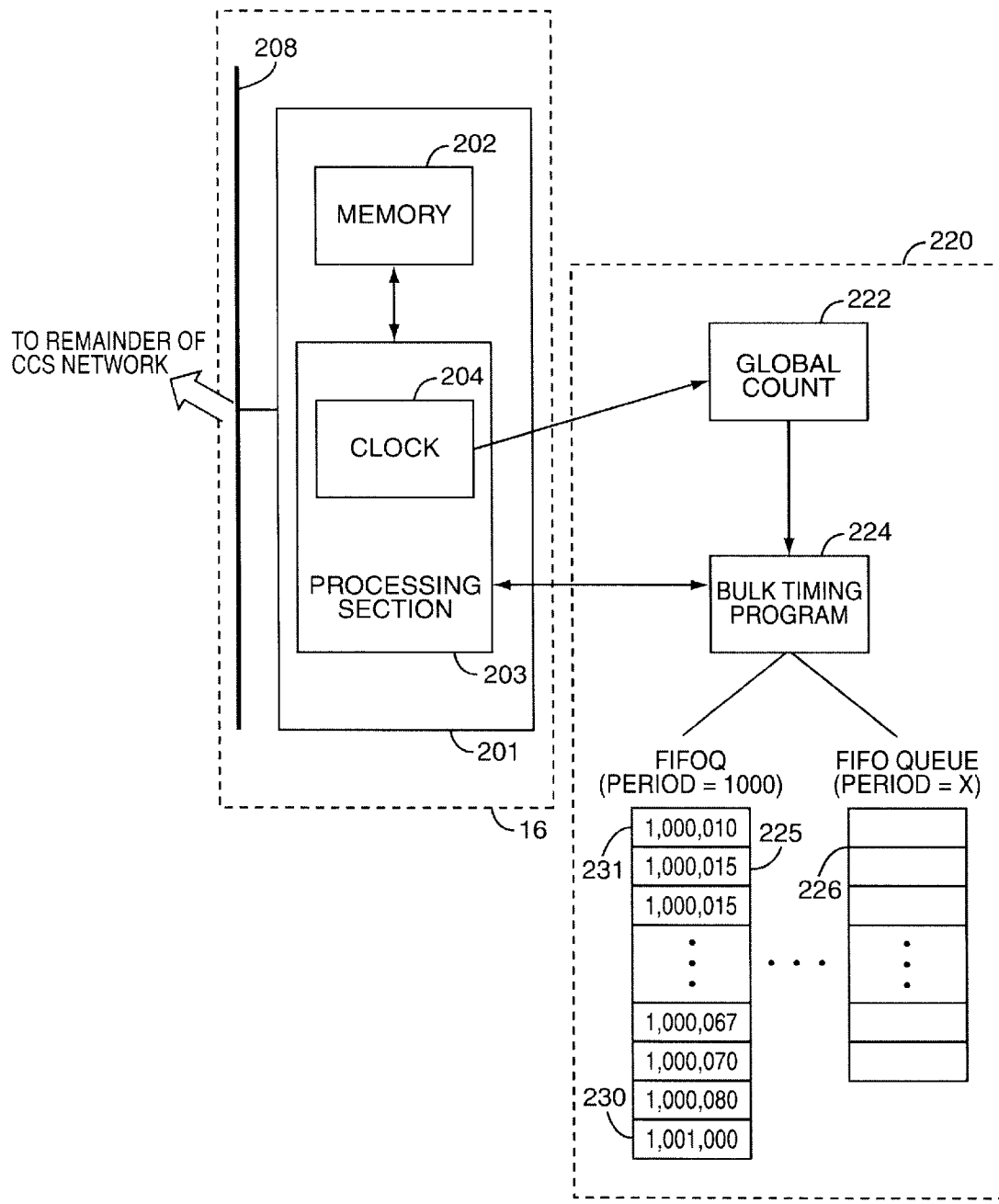
FIG. 2 is a high level block diagram illustrating the inter-operation of hardware and software components consistent with the present invention.

FIG. 2 is a high level block diagram illustrating the interoperation of the hardware and software components according to an embodiment of the present invention. System hardware 201, which is preferably implemented in STPs 16, includes a processing section 203 and a memory 202. Bus 208 connects the system hardware 201 to the rest of the STP and the CCS network. Memory 202 stores computer instructions for implementing the method of the present invention, and is preferably random access memory (RAM), but may additionally or alternatively include any type of conventional computer volatile or non-volatile memory, including a disk drive. Processing section 203 reads and executes computer instructions from memory 202, and preferably is a RISC based processor such the Motorola 860, but may be any other suitable instruction processing device.

Processing section 203 includes a hardware clock 204 dedicated to keeping track of the passage of time. Clock 204 may be, for example, a crystal oscillating circuit outputting a signal every microsecond.

The contents of block 220 illustrate the function of software components stored in memory 202 in accordance with the present invention. These software components can be broadly categorized as global counter 222, bulk timing program 224, and queues 225 through 226. Bulk timing program 224 receives instructions and new real-time events from processing section 203, and manages the received real-time events using global counter 222 and queues 225–226. When a real-time event expires, bulk-timer program 224 notifies processing section 203.

Global counter 222 is incremented based on the output of clock 204, and may be, for example, incremented one "tick" for every million cycles of clock 204.

Figure 3:
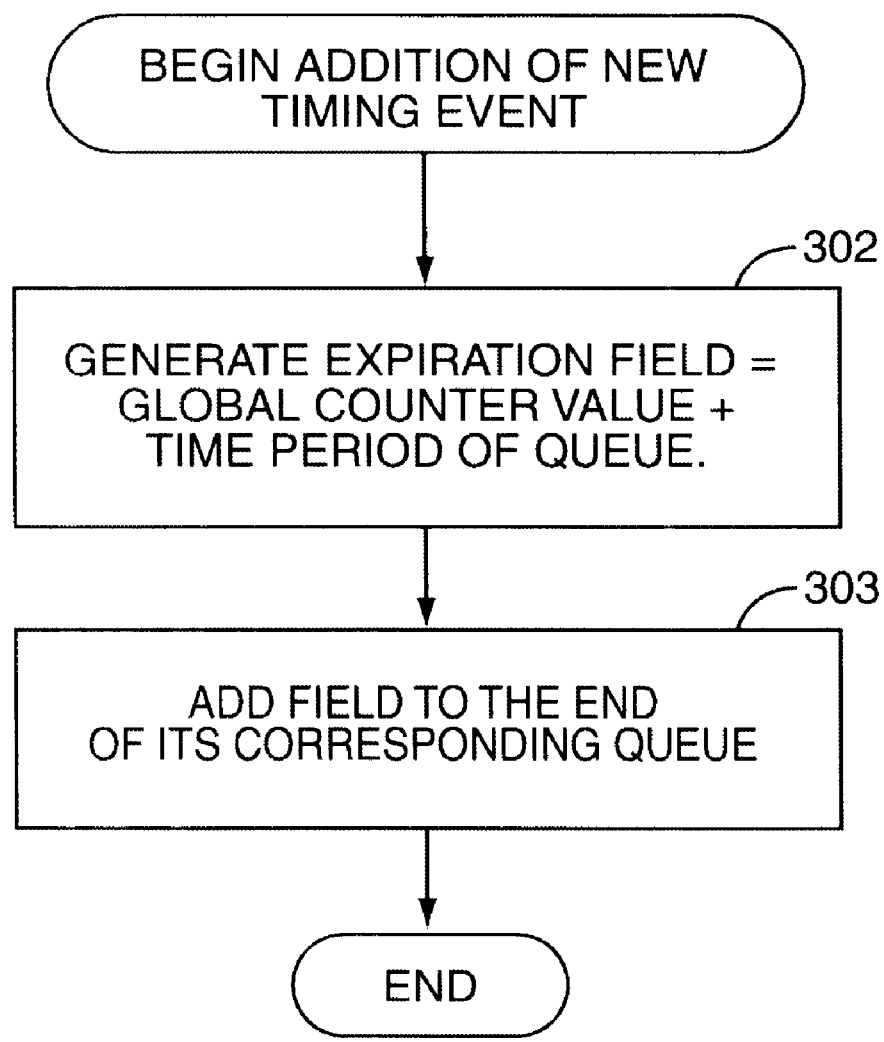
FIG. 3 is a flow chart illustrating the interaction of the software components when a real-time event is received.

FIG. 3 is a flow chart illustrating the interaction of global counter 222, bulk timing program 224, and queues 225–226, when a real-time event is received by bulk timing program 224. When a new event from processing section 203 is received, bulk timing program 224 generates an expiration field equal to the new time period plus the value in global counter 222 (step 302), and adds this new field to the end of the corresponding queue (step 303). Preferably, and as shown in FIG. 3, bulk timing program 224 knows in advance the possible time periods that may be received, and accordingly, pre-generates queues, such as each of queues 225 through 226, for each possible time period.

As an example of the above procedure, assume that the value of global counter 222 is currently 1,000,000 ticks, and a new event is received that must be attended to in 1000 ticks. Bulk timer program 224 adds a field with the value 1,001,000 to the end of the queue corresponding to 1,000 tick events. This newly added end field is shown in FIG. 2 as field 230, while field 231 is at the beginning of the queue, so that field 231 will be the next element removed from the queue.

Figure 4:
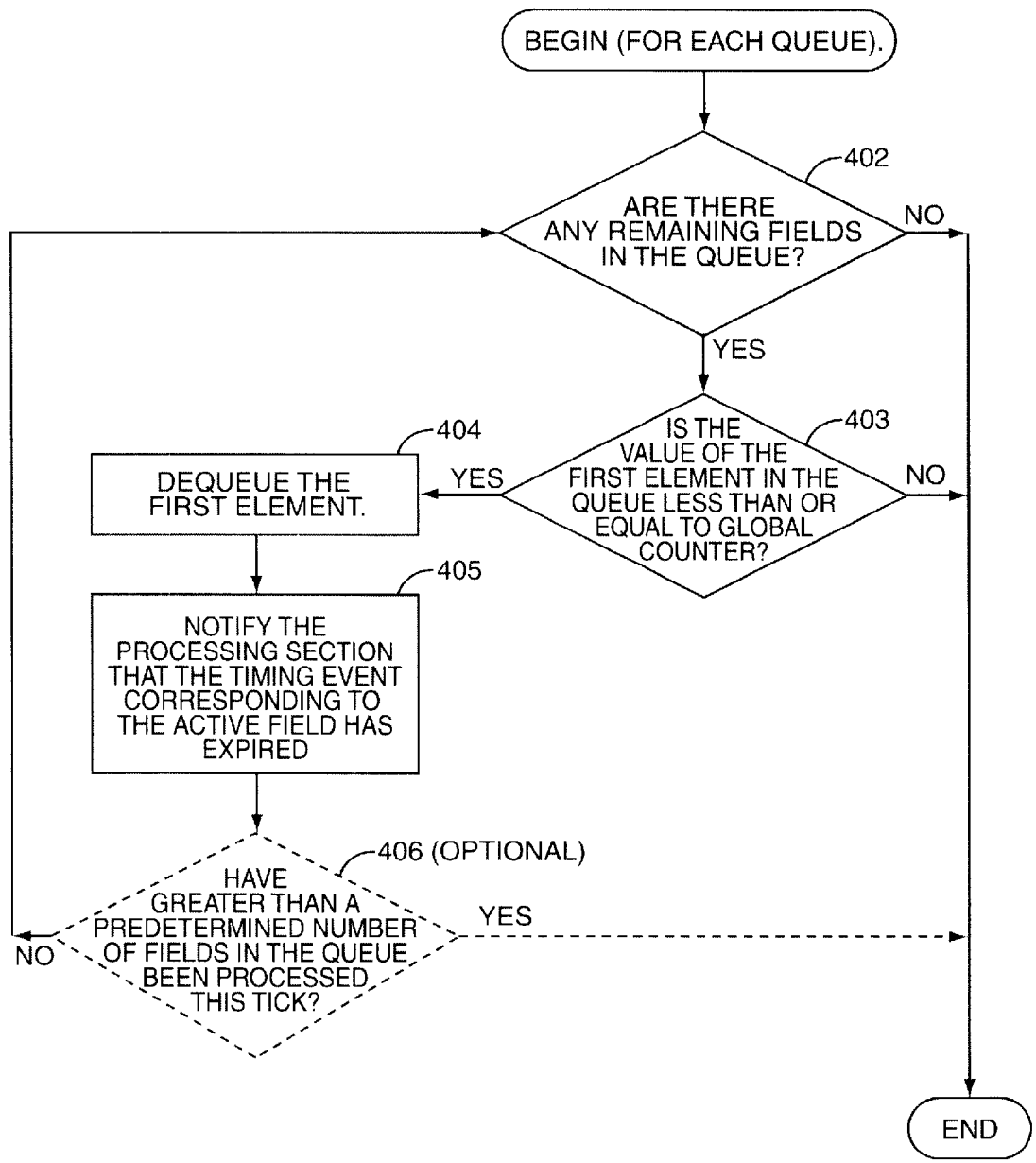
FIG. 4 is a flow chart illustrating checking for expired real-time events consistent with a method of the present invention.

In addition to handling new timing events, bulk timing program 224 periodically checks the queues and notifies processing section 204 of expired events so that appropriate action may be taken. FIG. 4 is a flow chart illustrating this procedure. If at least one field is present in a queue, its value is compared to the value of the global counter (steps 402 and 403). If the value of the compared field equals or is less than the global counter value, the event corresponding to the field has expired, and bulk timer program 224 dequeues the expired field and notifies processing section 201 (steps 404 and 405). These steps (402–405) are repeated until a field that has not expired is found. Because the queues are constructed such that they are sorted in sequential order, finding the first unexpired field in a particular queue indicates the succeeding fields in the queue are also unexpired. The queues are checked at intervals appropriate to the interval being timed by the queue. For example, an event with a 30 second interval may be checked every second.

In some situations, a large number of events may expire at the same time, leading to delays in other sections of the system. Accordingly, an optional step (step 406) may be used to limit the number of events allowed to expire for each queue.

The novel method and apparatus described above efficiently manages large numbers of real-time processing events. The present invention is particularly suited for use in STPs of a CCS network, because the nature of the CCS network requires many real-time events with identical period to be serviced.

It will be apparent to those skilled in the art that various modifications and variations can be made to the present invention without departing from the scope or spirit of the invention. For example, although the above described method and apparatus uses a different queue for each timing event having a different time period, a single linked list could be used for all the events. A single linked list has the advantage of requiring fewer comparisons when checking for expired timers, but has a disadvantage in that increased processing is necessary to add fields to the queue because a binary search is required to find the correct position in the linked list to insert the new field. Further, although the present invention has been primarily described using a queue, other suitable data structures such as a linked list may be used.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of managing a plurality of real-time events each requiring action to be taken after a predetermined time period, the method comprising the steps of:

generating values corresponding to each said event from a value of a global counter and the predetermined time period of the corresponding event;

placing the generated values in corresponding fields;

storing the fields in a queue at a position in the queue in ascending order according to their values; and sequentially comparing the fields in the queue to the global counter starting at the first field in the queue and ending when the value of the global counter is below the value of the most recently compared field;

whereby each field for which the global counter is greater than or equal to the value corresponds to an expired event.

2. The method of claim 1, wherein the generating step further includes the step of calculating the value of the field by adding the value of the global counter to the predetermined time period of the event.

3. The method of claim 1, wherein the storing step further includes the step of storing the generated fields by adding each newly generated field at the end of the queue.

4. The method of claim 1, wherein the checking step further includes the step of terminating the checking of the queue if more than a predetermined number of comparisons are made.

5. A computer system comprising:
   a memory including a global counter and at least one queue;
   means for generating values corresponding to real-time events received by the computer system, the generated values based on a value of the global counter and a predetermined time period associated with the corresponding event,
   means for placing the generated values in corresponding fields;
   means for storing the fields in a queue at a position such that the fields are stored farther back in the queue relative to fields stored previously in the queue; and
   means for sequentially comparing the fields in the queue to the global counter starting at the beginning field in the queue and ending when the value of the global counter is below the value of the most recently compared field; and
   a processor configured to execute programs in the memory.

6. The computer system of claim 5, wherein the computer system further includes a bus coupling the computer system to a common channel signaling telecommunications network.

7. The computer system of claim 5, further including means for calculating the value of the field by adding the value of the global counter to the predetermined time period of the event.

8. The computer system of claim 5, further including means for terminating the checking of the queue if greater than a predetermined number of comparisons are made.

9. A computer readable medium containing instructions executable on a computer for managing a plurality of real-time events, each said event requiring action to be taken after a predetermined time period, the instructions when executed on the computer performing the steps of:
   generating values corresponding to each said event from a value of a global counter and the predetermined time period of the corresponding event;
   placing the generated values in corresponding fields;
   storing the fields in a queue at a position in the queue in ascending order according to their values; and
   sequentially comparing the fields in the queue to the global counter starting at a first field in the queue and ending when the value of the global counter is below the value of the most recently compared field;
   whereby each field for which the global counter is greater than or equal to the value corresponds to an expired event.

10. The computer readable medium of claim 9, further including instructions for performing the step of calculating the value of the field by adding the value of the global counter to the predetermined time period of the event.

11. The computer readable medium of claim 9, further including instructions for storing the generated fields by adding each newly generated field at the end of the queue.

12. The computer readable medium of claim 9, further including instructions for terminating the checking of the queue if more than a predetermined number of comparisons are made.

13. A telecommunications network comprising:
   a plurality of signaling transfer points (STPs) configured to route CCS messages between Service Switching Points (SSPs) and Service Control Points (SCPs) in the network, each of the STPs including a computer system comprising:
      a memory including a global counter and at least one queue; and
      a processor including means for:
         generating values corresponding to real-time events received by the computer system from a value of the global counter and a predetermined time period associated with the corresponding event,
         placing the generated values in corresponding fields;
         storing the fields in a queue at a position such that the fields are stored farther back in the queue relative to fields stored previously in the queue; and
         sequentially comparing the fields in the queue to the global counter starting at the beginning field in the queue and ending when the value of the global counter is below the value of the most recently compared field.

14. The network of claim 13, wherein the computer system further includes a bus coupling the computer system to a common channel signaling telecommunications network.

15. The network of claim 13, wherein the processor further includes means for calculating the value of the field by adding the value of the global counter to the predetermined time period of the event.

16. The network of claim 13, wherein the processor further including means for terminating the checking of the queue if greater than a predetermined number of comparisons are made.

* * * * *